Feb. 7, 1933.  C. F. TEFFT  1,896,126
PROCESS FOR SURFACE TREATING BRICKS AND BRICKS MADE THEREBY
Filed March 20, 1929
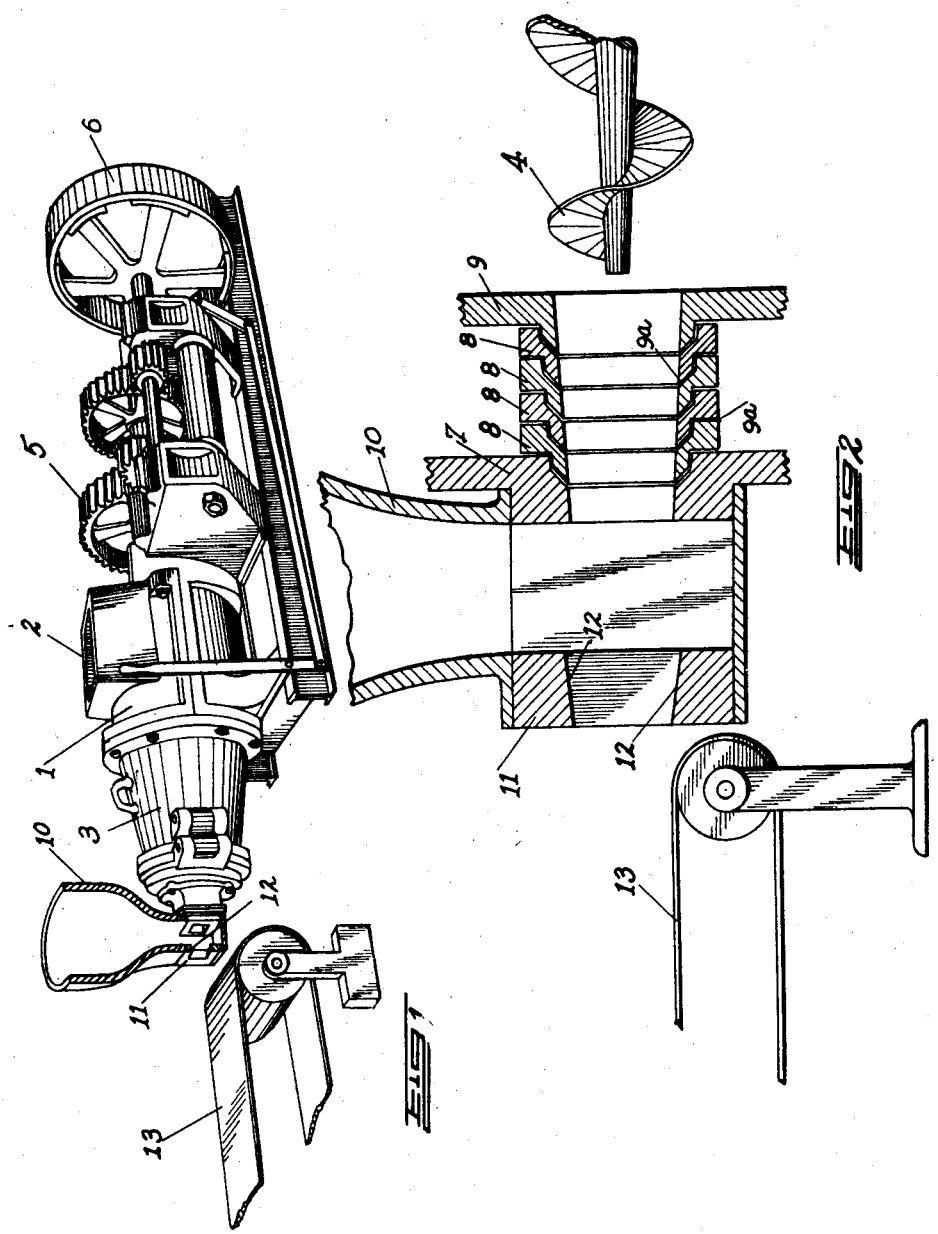
INVENTOR.
C Forrest Tefft
BY
Allen & Allen
ATTORNEY.

Patented Feb. 7, 1933

1,896,126

UNITED STATES PATENT OFFICE

CHARLES FORREST TEFFT, OF COLUMBUS, OHIO, ASSIGNOR TO THE CLAYCRAFT MINING & BRICK COMPANY, OF COLUMBUS, OHIO, A CORPORATION OF OHIO

PROCESS FOR SURFACE TREATING BRICKS AND BRICKS MADE THEREBY

Application filed March 20, 1929. Serial No. 348,538.

My invention relates to a new type of brick and to a process for treating brick to give them an aged surface appearance.

In the art of brick making it has long been proposed to veneer the exposure surfaces with a different type of clay than was used for making the brick. This enables an inferior grade brick material to be used for the body of the brick with the exposure portions having the appearance of high grade bricks. Further, various methods have been proposed to roughen the exposure surfaces so that the brick will have a weathered appearance. Such bricks are called "texture" bricks.

It is the object of my invention to provide a process which is, in a way, similar to both the veneering and texture roughening art but which combines both processes in a novel manner which enables a brick to be made which has what might be called an artificially antiqued appearance.

There are three main processes for manufacturing brick. The first is the hand-made process which results in bricks which warp in drying into various shapes and sizes which give the wall a very beautiful, irregular appearance. The hand-made process is, however, very expensive. The second process is called the wet mud process. In this process the bricks are pressed in molds and due to the relatively high percentage of moisture incorporated in the bricks, various degrees of drying and burning result in pleasingly irregular contours. This process is also expensive. The third process, and that to which my invention relates, is called the "stiff mud process" and consists in forcing, under heavy pressure, as by an auger feed screw, a plastic mass through a restricted orifice or die from which the brick issues in an endless column which is subsequently cut-off with wires into the brick sizes desired. This is the most inexpensive process, and it is to this latter process that my invention is particularly adapted.

It is specifically the object of my invention to provide in combination with any standard type of auger brick machine or machine for making bricks by the stiff mud process for a supplemental head which will retain a die spaced from the regular die which will have sides sloping to the discharge end. In the head, which will ordinarily have an interior shaped like a hopper, it is my object to feed a mixture composed, for example, of water, sand, clay and coloring matter, which it is my desire to have effect both the color and surface of the brick which is dragged along with the column through the spaced die and in passing through the second die is ground and imbedded into the surface of the column producing a roughening effect which will result in the bricks made being unlike in either color or surface roughness any brick which has, to the best of my knowledge and belief been heretofore made.

The above and other objects to which reference will be made in the ensuing disclosure I accomplish by arranging mechanism and carrying out the process in accordance with the following description.

Referring to the drawing:—

Figure 1 is a perspective view of an auger brick machine.

Figure 2 is an enlarged vertical sectional view through the head of the machine which is equipped with the spaced die which I find desirable in carrying out my invention.

Referring briefly to the machine, I have shown a casing 1 in which is formed a hopper 2 through which the mud is fed into the machine. There is a gradually tapering nozzle-like casing 3 within which an auger feeding conveyor 4 is rotated. The conveyor or screw is rotated by suitable gearing 5 which may conveniently be operated by a motor 6. Secured at the discharge end of the nozzle shaped casting 3 there is a die which, as indicated in Figure 2, is composed of a mouthpiece 7, spaced liners 8, and a back plate 9. In most auger machines of this type steam or other suitable lubricant is forced through the openings 9a between the liners.

In ordinary manufacture the mud is fed into the hopper and forced with the auger through the die, from which it discharges in a continuous column onto a conveyor belt. The form is subsequently cut with wires into bricks of the desired size.

In order to carry out my process with an auger brick machine, such as I have described, I attach a hopper 10, which is shown in section in Figure 1, to the head of the machine. Within the hopper in alignment with and at a suitably spaced distance, such as six inches, from the die or mouth-piece, I mount a die 11 which is of similar contour as the mouth-piece only slightly larger in size. From the intake side to the discharge side the walls of the die 11 are tapered as indicated at 12 in Figure 2 so that in passing from the mouth-piece die 7 to the die 11 the form will pick up and grind into its surface the material which is filled in the hopper. The layer of the mixture applied to the surface is so thin that its thickness cannot be observed when a brick is broken.

In carrying out my process I proceed as in standard practice to make a stiff mud which I feed into the hopper 2. This is carried along with the auger and forced through the mouth-piece. Into the hopper 10 I pour a slush or mixture of the consistency of mortar and composed, for example, of five parts of sand to one part of clay, coloring matter and enough water to give it a desired consistency. This mixture surrounds the column as it passes from the mouth-piece and as the walls of the spaced die are tapered some of the slush is dragged along with the column through the second die. The grinding into the surface of the column is thus accomplished by the movement of the column itself through the die. The exposure faces of the column are thus roughened and some of the material is ground into the surface of the column.

Coloring material, such as hematite, Venetain red, manganese dioxide and chromic oxide are mixed either singly or in desired proportions with the slush or surfacing mixture. After issuing from the spaced die the column passes onto a belt conveyor such as is indicated at 13 which carries the column to the machine which cuts it into brick sizes.

In burning the bricks, due to the different degree of penetration of the slip into the walls of the column, various colors will result which add to the roughened surface of the bricks and give a wall in which the bricks are laid, an antique appearance which is very attractive and quite unlike any artistic effect which I have as yet seen produced. In this connection the roughening of the exposure surfaces of the brick in and of itself results in different color and tone effects even if the surfacing mixture is colored similarly to the stiff mud mixture.

While my process and the bricks made thereby, are preferably made with the type of machine described, other mechanism in which the column itself, by its movement, grinds a surfacing composition into its surface may be also employed.

I have specified that the granular material which causes the roughening of the surface be sand, but other materials may be used for obtaining similar results. Salt, for example may be used which in burning the bricks will impart a glaze. Sawdust or other pulverant material may also be used, which, in burning, will impart to the bricks other changes in physical condition and appearance.

Having thus described my invention, what I claim as new and desire to secure by Letters Patent, is:—

1. In a method of producing ornamental bricks, the steps comprising forming a column of wet clay, applying an abrasive slush to the column, then commingling the slush superficially with the wet clay surface of the column by subjecting the slush to the grinding action of a restricted die.

2. In a method of producing ornamental bricks, the steps comprising forming a column of wet clay, applying an abrasive slush containing sand to the column, then commingling the slush superficially with the wet clay surface of the column by subjecting the slush to the grinding action of a restricted die.

3. In a method of producing ornamental bricks, the steps comprising forming a column of wet clay, applying an abrasive slush containing coloring matter to the column, then commingling the slush superficially with the wet clay surface of the column by subjecting the slush to the grinding action of a restricted die.

4. An ornamental burnt brick having a film of abrasive slush ground superficially into its surface.

5. An ornamental burnt brick having a film of abrasive slush containing sand ground superficially into its surface.

6. An ornamental burnt brick having a film of abrasive slush containing coloring matter ground superficially into its surface.

C. FORREST TEFFT.